(12) United States Patent
Pal

(10) Patent No.: US 9,200,534 B2
(45) Date of Patent: Dec. 1, 2015

(54) TURBINE NOZZLE HAVING NON-LINEAR COOLING CONDUIT

(71) Applicant: General Electric Company, Schenectady, NY (US)

(72) Inventor: Dipankar Pal, Greenville, SC (US)

(73) Assignee: General Electric Company, Schenectady, NY (US)

( * ) Notice: Subject to any disclaimer, the term of this patent is extended or adjusted under 35 U.S.C. 154(b) by 563 days.

(21) Appl. No.: 13/675,281

(22) Filed: Nov. 13, 2012

(65) Prior Publication Data

US 2014/0130514 A1  May 15, 2014

(51) Int. Cl.
| | |
|---|---|
| *F03D 11/00* | (2006.01) |
| *F01D 25/12* | (2006.01) |
| *F01D 5/18* | (2006.01) |
| *F02C 3/00* | (2006.01) |

(52) U.S. Cl.
CPC ............. *F01D 25/12* (2013.01); *F01D 5/186* (2013.01); *F01D 5/188* (2013.01); *F02C 3/00* (2013.01); *F05D 2240/81* (2013.01)

(58) Field of Classification Search
CPC .......... F05D 2260/204; F05D 2240/80; F05D 2240/81; F01D 5/186; F01D 5/18; F01D 5/14; F01D 5/12; F01D 5/188; F01D 5/181; F01D 9/065
USPC ........................................................ 415/115
See application file for complete search history.

(56) References Cited

U.S. PATENT DOCUMENTS

| | | | |
|---|---|---|---|
| 5,340,278 A | 8/1994 | Magowan | |
| 6,382,908 B1 | 5/2002 | Keith et al. | |
| 6,644,920 B2 | 11/2003 | Beeck et al. | |
| 6,830,432 B1 | 12/2004 | Scott et al. | |
| 7,097,417 B2 | 8/2006 | Liang | |
| 7,775,769 B1 | 8/2010 | Liang | |
| 7,927,073 B2 | 4/2011 | Scott et al. | |
| 2008/0085190 A1 * | 4/2008 | Liang | ........................ 416/193 A |

(Continued)

FOREIGN PATENT DOCUMENTS

| | | |
|---|---|---|
| EP | 0416542 A1 | 3/1991 |
| EP | 1211384 A2 | 6/2002 |
| EP | 2666965 A1 | 11/2013 |

OTHER PUBLICATIONS

Yoo, Office Action Communication for U.S. Appl. No. 13/675,293 dated Dec. 4, 2014, 21 pages.

(Continued)

*Primary Examiner* — Edward Look
*Assistant Examiner* — Jason Mikus
(74) *Attorney, Agent, or Firm* — Ernest G. Cusick; Hoffman Warnick LLC

(57) ABSTRACT

A turbine nozzle having a non-linear cooling conduit is disclosed. In one embodiment, a turbine nozzle includes: an airfoil, at least one endwall adjacent the airfoil, and a fillet region connecting the airfoil and the at least one endwall, the fillet region including an outer surface. The turbine nozzle also includes a non-linear cooling conduit located within the fillet region and adjacent the outer surface of the fillet region, the non-linear cooling conduit allows fluid flow through the fillet region. The non-linear cooling conduit spans substantially along an axial length of the airfoil between a leading edge of the airfoil and a trailing edge of the airfoil. Additionally, the non-linear cooling conduit includes an arc profile substantially similar to an arc profile of the airfoil.

17 Claims, 13 Drawing Sheets

(56) References Cited

U.S. PATENT DOCUMENTS

| | | |
|---|---|---|
| 2008/0279695 A1 | 11/2008 | Abdel-Messeh et al. |
| 2011/0143162 A1 | 6/2011 | Merrill et al. |
| 2011/0217179 A1 | 9/2011 | Wiebe |
| 2011/0223005 A1 | 9/2011 | Lee et al. |
| 2012/0087803 A1 | 4/2012 | Butler et al. |
| 2013/0312941 A1* | 11/2013 | Bunker .................... 165/133 |

OTHER PUBLICATIONS

Yoo, Office Action Communication for U.S. Appl. No. 13/675,293 dated Apr. 20, 2015, 10 pages.

European Search Report and Opinion issued in connection with corresponding EP Application No. 13192209.8 on Feb. 28, 2014.

Yoo, Notice of Allowance and Fee(s) Due for U.S. Appl. No. 13/675,293 dated Aug. 3, 2015, 14 pages.

* cited by examiner

TURBINE NOZZLE HAVING NON-LINEAR COOLING CONDUIT

CROSS-REFERENCE TO RELATED APPLICATION

The current application is related to U.S. patent application Ser. No. 13/675,293, titled "METHOD FOR MANUFACTURING A TURBINE NOZZLE HAVING NON-LINEAR COOLING CONDUIT," filed on Nov. 13, 2012.

BACKGROUND OF THE INVENTION

1. Technical Field

The subject matter disclosed herein relates to turbine systems. Specifically, the subject matter disclosed herein relates to turbine nozzles and/or vanes and turbine systems having such nozzles and/or vanes.

2. Related Art

Conventional combustion turbine systems typically include a compressor device for compressing inlet air and sending the compressed air to a combustor device, which mixes the compressed air with fuel. Once the compressed air is mixed with fuel, the air-fuel mixture is ignited to generate a hot gas flow, which can be provided to a turbine device to perform mechanical work. The turbine device generates power by passing the hot gas over a plurality of stator vanes and rotating blades of the turbine device. The stationary vanes and rotating blades can aid in power generation by directing the hot gas flow through the turbine device.

The efficiency of a conventional turbine system can be increased by increasing the temperature of the hot gas flow that passes through the turbine device. However, the ability to increase the temperature of the hot gas flow is limited by the ability of the stator vanes and the rotating blades to withstand the high temperature of the hot gas flow. More specifically, the fillet region (e.g., geometric transition zone between an airfoil and an endwall) of the vanes/blades is typically the first portion to suffer from mechanical failure when increasing the temperature of the hot gas flow within the turbine device. Conventionally, cooling features utilized by the vanes/blades. More specifically, conventional turbine vanes/blades include a plurality of cooling holes drilled directly into the fillet region or the airfoil portion of the vanes/blades. The cooling holes create a cooling passage between a cavity of an airfoil and the outside surface of the vane/blade. This passage provides cooling fluid (e.g., cooling air) throughout the vane/blade to reduce the temperature during operation of the conventional turbine system.

However, because the holes are drilled directly into the vane/blade at a shallow angle to the surface, spallation (e.g., fragmentation of a material layer) typically occurs during manufacturing. Spallation of a ceramic layer formed over the vane/blade can reduce mechanical strength, which may cause premature mechanical failure of the vane/blade. Spallation can also cause mechanical defects in the vane/blade, which can preclude the defective vane/blade from being used in a conventional turbine system.

BRIEF DESCRIPTION OF THE INVENTION

A turbine nozzle having a non-linear cooling conduit is disclosed. In one embodiment, the turbine nozzle includes: an airfoil; at least one endwall adjacent the airfoil; a fillet region connecting the airfoil and the at least one endwall, the fillet region including an outer surface; and a non-linear cooling conduit located within the fillet region and adjacent the outer surface of the fillet region, the non-linear cooling conduit for allowing fluid flow through the fillet region.

A first aspect of the invention includes a turbine nozzle including: an airfoil; at least one endwall adjacent the airfoil; a fillet region connecting the airfoil and the at least one endwall, the fillet region including an outer surface; and a non-linear cooling conduit located within the fillet region and adjacent the outer surface of the fillet region, the non-linear cooling conduit for allowing fluid flow through the fillet region.

A second aspect of the invention includes a turbine nozzle including: an airfoil; a cavity located within the airfoil, the cavity including an inner surface; at least one endwall adjacent the airfoil; a fillet region connecting the airfoil and the at least one endwall, the fillet region including an outer surface; an aperture extending through the outer surface of the fillet region to the cavity within the airfoil; a groove formed on a portion of the inner surface of the at least one cavity substantially adjacent the aperture; and a cover plate positioned over the aperture and a portion of the groove formed on the inner surface of the at least one cavity, the cover plate forming a non-linear cooling conduit between the cavity and the outer surface of the fillet region.

A third aspect of the invention includes a turbine system having: a compressor; a combustor in fluid communication with the compressor; and a turbine in fluid communication with combustor, the turbine including at least one turbine nozzle. The at least one turbine nozzle includes: an airfoil; at least one endwall adjacent the airfoil; a fillet region connecting the airfoil and the at least one endwall, the fillet region including an outer surface; and a non-linear cooling conduit located within the fillet region and adjacent the outer surface of the fillet region, the non-linear cooling conduit for allowing fluid flow through the fillet region during operation of the turbine system.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
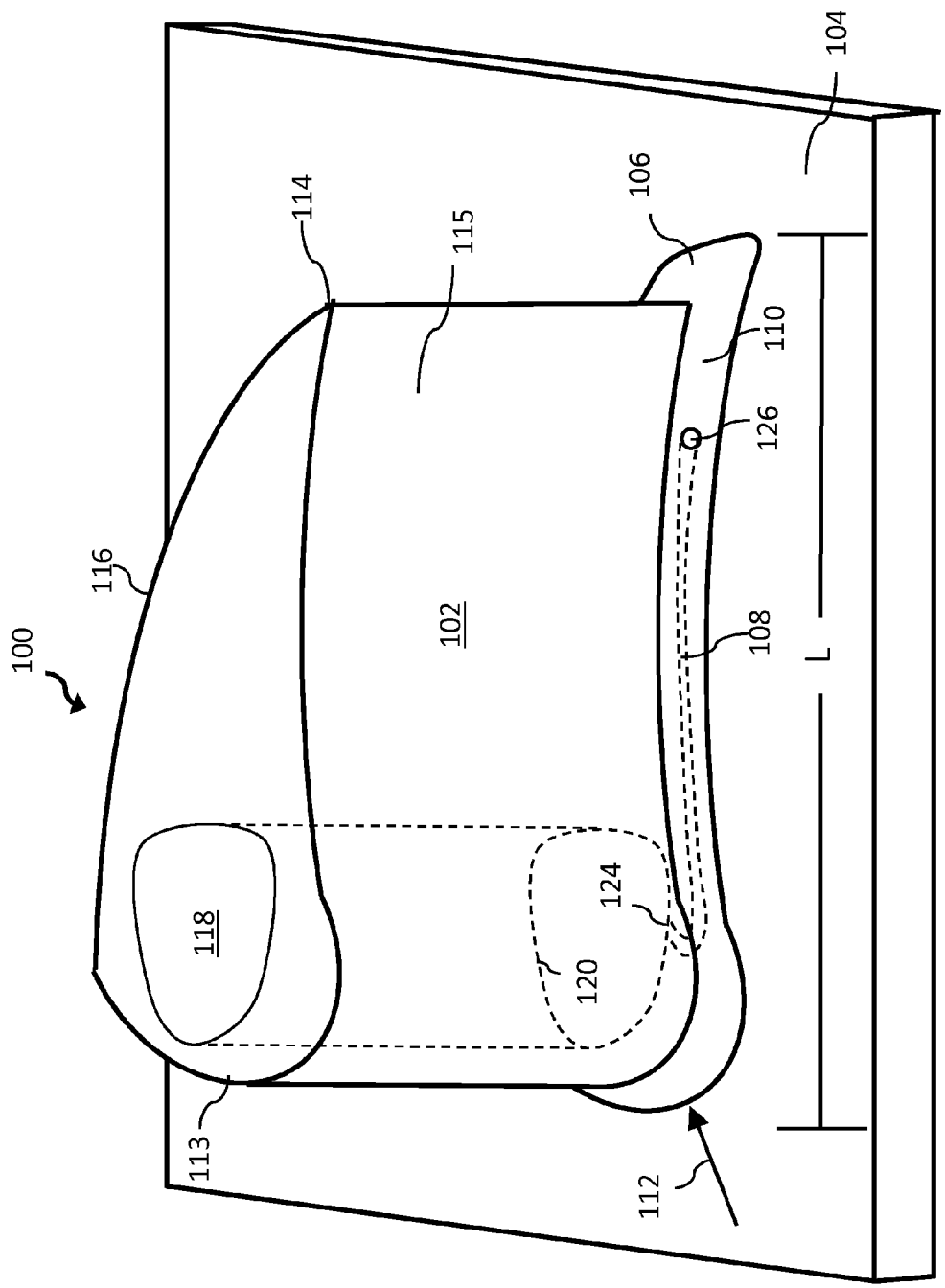
FIG. 1 shows a schematic cut-away perspective view of a turbine nozzle including a non-linear cooling conduit, according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As described herein, aspects of the invention relate to turbine systems. Specifically, aspects of the invention relate to a turbine nozzle having a non-linear cooling conduit, and turbines employing such nozzles.

Turning to FIG. 1, a schematic cut-away perspective view of a turbine nozzle including a non-linear cooling conduit is shown according to various embodiments of the invention. Turbine nozzle 100 can include a stator vane (static nozzle) in a static nozzle assembly, or a non-stationary (e.g., rotating) airfoil within a set of rotor airfoils for any conventional turbine system, e.g., a gas turbine system, steam turbine, system, etc. In various embodiments, turbine nozzle 100 is part of a gas turbine static nozzle assembly, e.g., including a plurality of turbine nozzles, which may include features similar to turbine nozzle 100 described herein.

Turbine nozzle 100 may include an airfoil 102, at least one endwall 104 adjacent airfoil 102, and a fillet region 106 connecting airfoil 102 and the at least one endwall 104. Fillet region 106 may be formed during the manufacturing of turbine nozzle 100. More specifically, airfoil 102 and endwall 104 may be separate components mechanically coupled by any now known or later developed method of mechanical coupling, e.g., welding, brazing, fastening, etc. In this example, fillet region 106 may be formed at the respective interfaces of airfoil 102 and endwall 104 that may be coupled to one another. In an alternative embodiment, where turbine nozzle 100 is created as a single, turbine component, fillet region 106 may be created during the casting process of turbine nozzle 100. More specifically, fillet region 106 may be formed during the same process of forming single component turbine nozzle 100 by any now known or later developed forming technique, e.g., integral casting, forging, milling, injection molding, etc. Turbine nozzle 100 may be made of any conventional material (e.g., titanium alloy) used for creating nozzles used in a conventional combustion turbine system. Additionally, Turbine nozzle 100 may be coated in a ceramic layer or any other conventional thermal barrier material of lower thermal conductivity compared to the material used in forming turbine nozzle 100. The coating of turbine nozzle 100 may be used to withstand the high temperatures of conventional combustion turbine system, as is known in the art.

Airfoil 102 may be a conventional stator airfoil, and endwall 104 may be a vane sidewall in an embodiment where turbine nozzle 100 is a stator vane. In an alternative embodiment, where turbine nozzle 100 may be a rotating airfoil, airfoil 102 may be a conventional bucket airfoil, and endwall 104 may be a conventional bucket base or platform.

In an embodiment, as shown in FIG. 1, turbine nozzle 100 may also include a non-linear cooling conduit 108 located within fillet region 106 and adjacent an outer surface 110 of fillet region 106. Non-linear cooling conduit 108 may allow fluid flow through fillet region 106 of turbine nozzle 100. More specifically, non-linear cooling conduit 108 may carry cooling fluid along the length of non-linear cooling conduit 108 for cooling fillet region 106 as a hot gas flow 112 passes over turbine nozzle 100.

Figure 2:
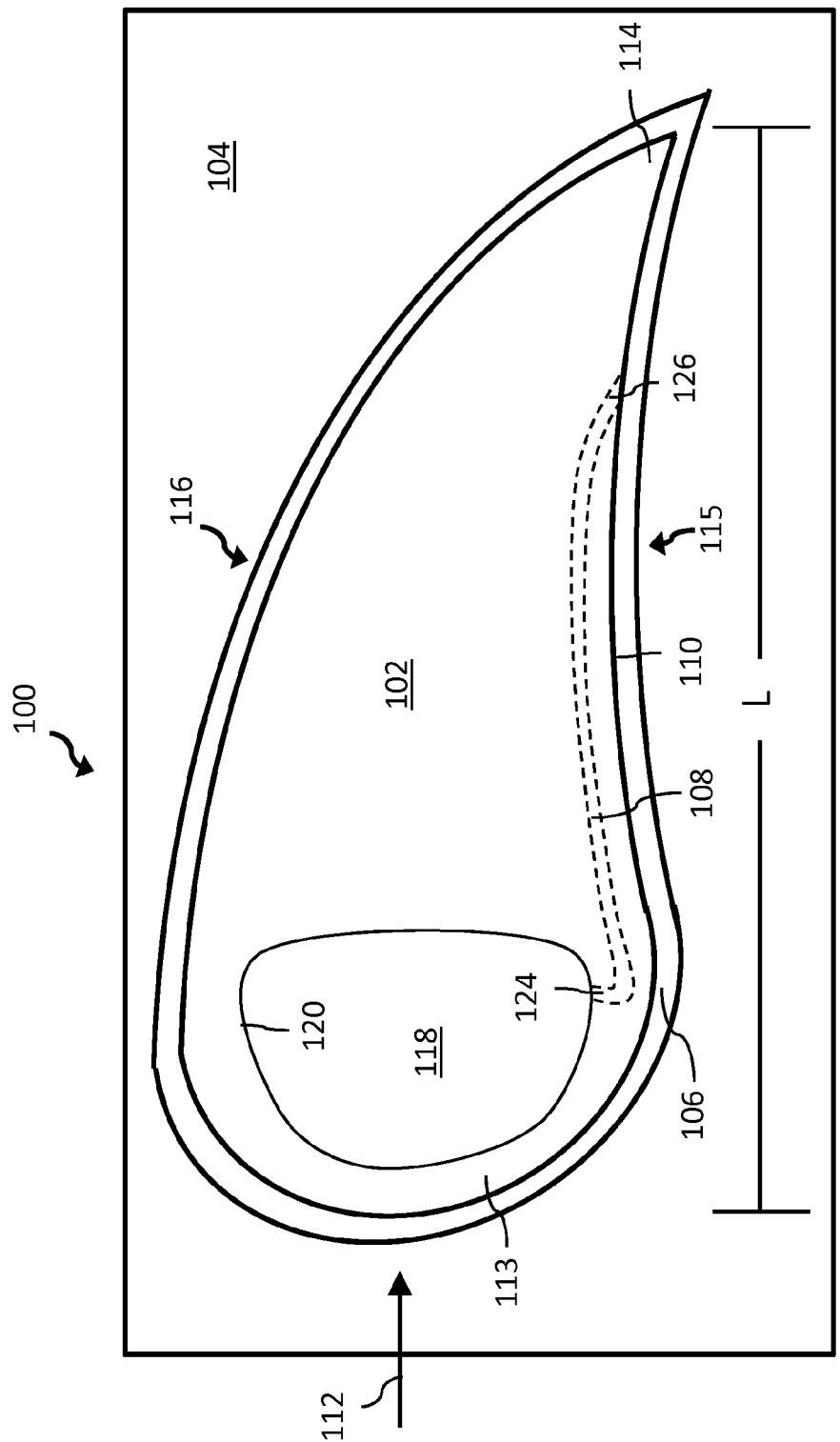
FIG. 2 shows a cross-sectional view of a turbine nozzle including a non-linear cooling conduit, according to embodiments of the invention.

In an embodiment, as shown in FIGS. 1 and 2, airfoil 102 may also include a leading edge 113, and a trailing edge 114 opposite leading edge 113. More specifically, leading edge 113 may be the first portion of turbine nozzle 100 in which hot gas flow 112 may pass over. Leading edge 113 may substantially divide hot gas flow 112 into two separate flow paths (e.g., pressure side and suction side) for flowing around airfoil 102 of turbine nozzle 100, as is known in the art. Trailing edge 114 may direct hot gas flow 112 in a desired direction as hot gas flow 112 flows off of airfoil 102 of turbine nozzle 100. Also shown in FIGS. 1 and 2, non-linear cooling conduit 108 may span substantially along an axial length (L) of airfoil 102 between leading edge 113 and trailing edge 114. More specifically, non-linear cooling conduit 108 may span for the majority (e.g., greater than 50%) of the axial length of airfoil 102. In contrast to conventional cooling holes, which are typically formed by straight drilling (e.g., rectilinear conduit) and formed substantially perpendicular to a face of a conventional airfoil, non-linear cooling conduit 108 may be positioned within fillet region 106 along the majority of an axial length (L) of airfoil 102 of turbine nozzle 100. In an embodiment, as shown in FIGS. 1 and 2, airfoil 102 may include a pressure face 115, and a suction face 116. As shown in FIGS. 1 and 2, non-linear cooling conduit 108 may be located proximate pressure face 115 of airfoil 102. In an alternative embodiment, as shown in FIG. 3, non-linear cooling conduit 108 may be located proximate suction face 116 of airfoil 102.

Figure 3:
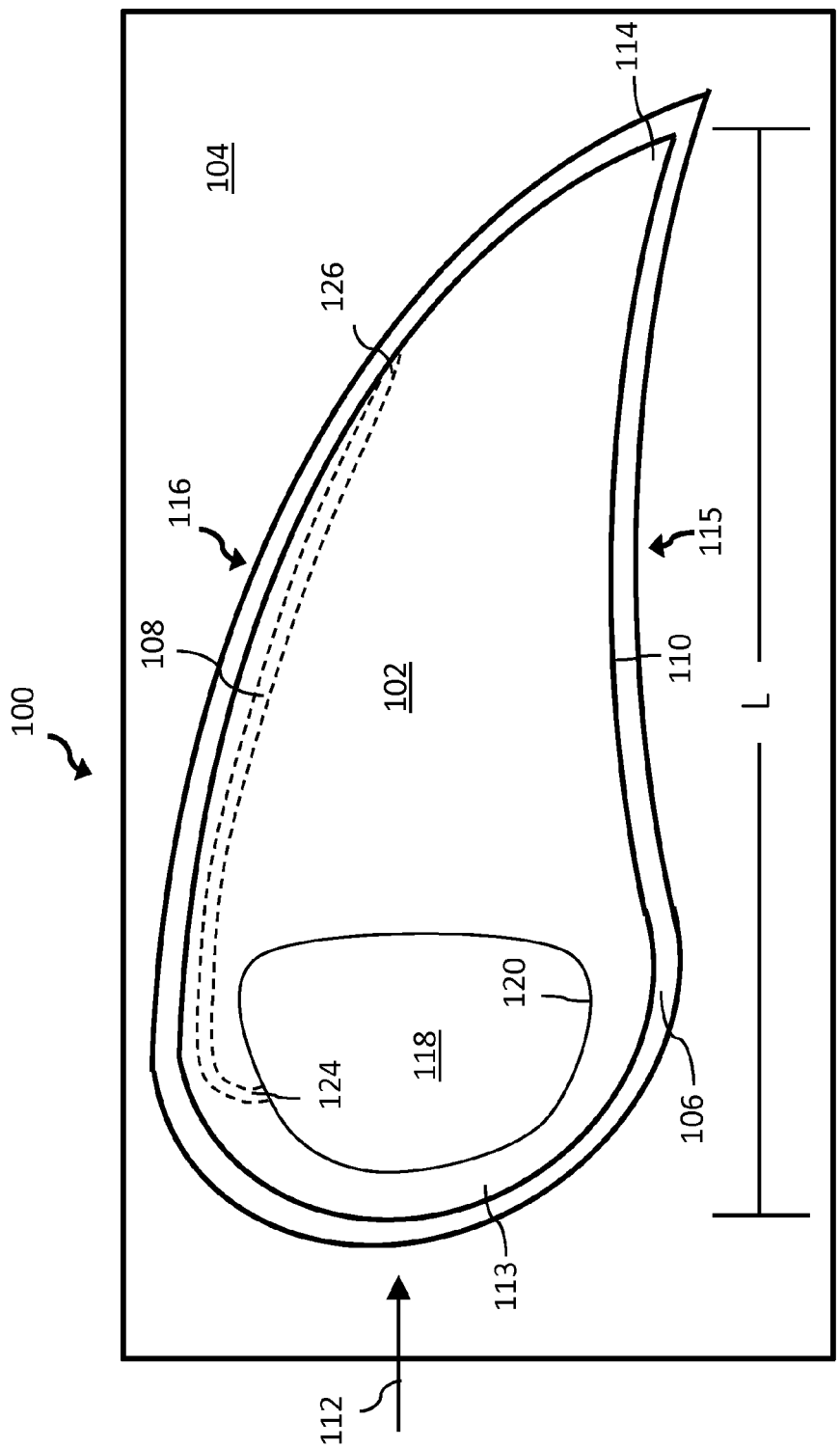
FIG. 3 shows a cross-sectional view of a turbine nozzle including a non-linear cooling conduit, according to an alternative embodiment of the invention.

As shown in FIGS. 1-3, non-linear cooling conduit 108 may include an arc profile substantially similar to an arc profile of airfoil 102. That is, non-linear cooling conduit 108 may be substantially non-linear with reference to the axial length (L), and may include an arc profile having a substantially similar arc profile as a respective face (e.g., pressure face 115, suction face 116) of airfoil 102. In an embodiment, as shown in FIG. 2, non-linear cooling conduit 108 may include a portion having an arc profile substantially similar to the arc profile of pressure face 115 of airfoil 102. In an alternative embodiment, as shown in FIG. 3, where non-linear cooling conduit 108 is located proximate suction side 116, non-linear cooling conduit 108 may include a portion having an arc profile substantially similar to the arc profile of suction face 116 of airfoil 102.

Figure 4:
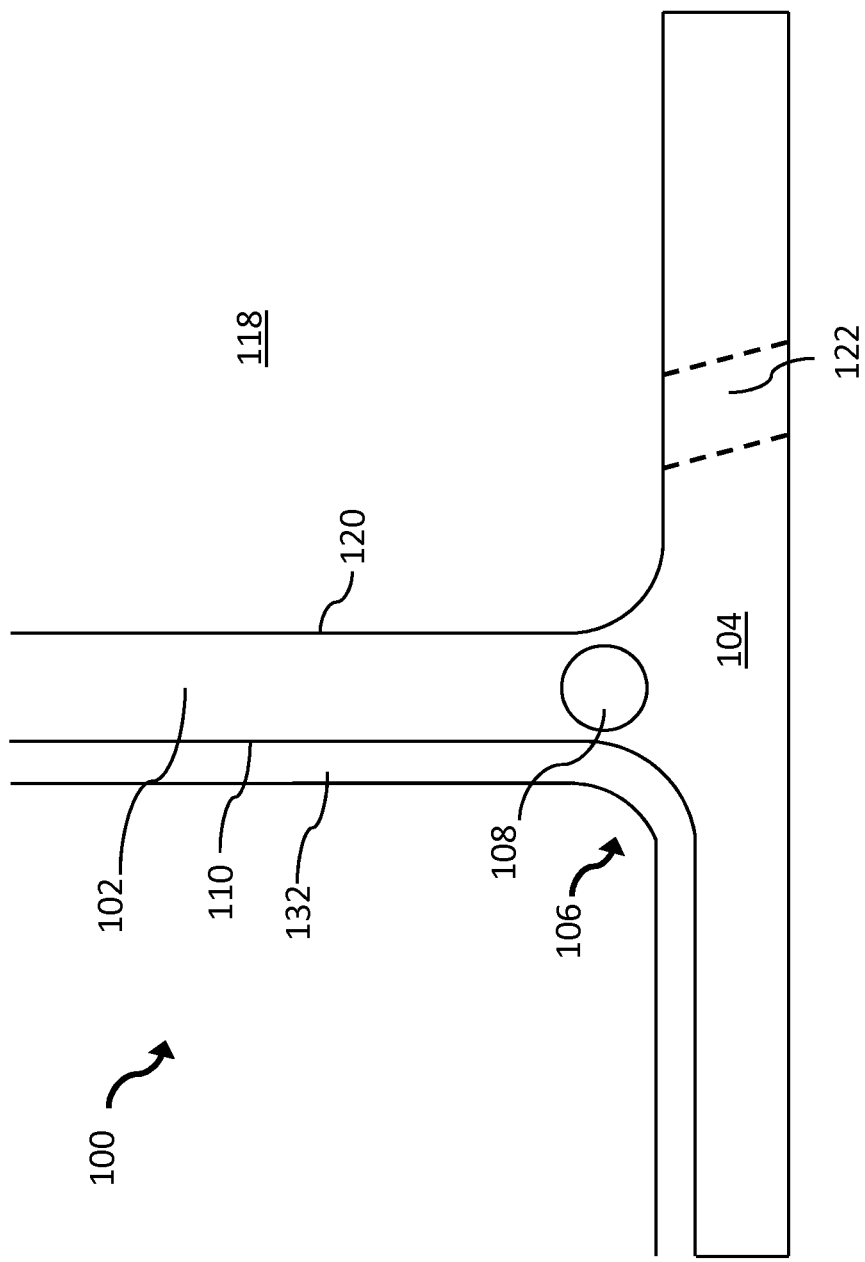
FIG. 4 shows a cross-sectional view of a portion of a turbine nozzle including a non-linear cooling conduit, according to embodiments of the invention.

As shown in FIGS. 1-2, airfoil 102 may include at least one cooling fluid cavity 118 having an inner surface 120. The at least one cooling fluid cavity 118 may be fluidly connected to non-linear cooling conduit 108 and may provide a cooling fluid (e.g., cooling air) to non-linear cooling conduit 108. Cooling fluid cavity 118 may receive cooling fluid from any conventional internal or external flow path for providing the cooling fluid to cooling fluid cavity 118. In an embodiment, as best shown in FIG. 4, endwall 104 may include an endwall aperture 122 in fluid communication with cooling fluid cavity 118 for providing cooling fluid to cooling fluid cavity 118. That is, cooling fluid positioned below cooling fluid cavity 118 may flow through endwall 104 and into cooling fluid cavity 118 via endwall aperture 122. It is understood that airfoil 102 may include at least one cavity (e.g., cooling fluid cavity 118, discharge cavity 128 (FIG. 5)), and more specifically, may include a plurality of cavities. The cavities of airfoil 102 may be configured as any geometric dimension within airfoil 102, such that a portion of airfoil 102 may be substantially hollow because of the cavities formed in airfoil 102. As such, it is also understood that the depicted dimensions and number of cavities (e.g., cooling fluid cavity 118, discharge cavity 128 (FIG. 5)) of airfoil 102 are merely exemplary embodiments and any number of configurations of the cavities of airfoil 102 may be included in accordance with embodiments described herein.

Returning to FIGS. 1 and 2, non-linear cooling conduit 108 may also include an inlet 124 located on inner surface 120 of cooling fluid cavity 118. Inlet 124 of non-linear cooling conduit 108 may receive the cooling fluid from cooling fluid cavity 118. More specifically, as best shown in FIG. 2, inlet 124 may continuously receive cooling fluid from cooling fluid cavity 118 in order to move the cooling fluid through non-linear cooling conduit 108.

In an embodiment, as best shown in FIGS. 1 and 2, non-linear cooling conduit 108 may also include an outlet 126 located on outer surface 110 of fillet region 106. Outlet 126 of non-linear cooling conduit 108 may discharge the cooling fluid from non-linear cooling conduit 108. More specifically, as shown in FIGS. 1 and 2, outlet 126 may receive the cooling fluid flowing through non-linear cooling conduit 108 and may discharge the cooling fluid from turbine nozzle 100. In an embodiment, as shown in FIGS. 1 and 2, outlet 126 may be fluidly connected to a flow path of a turbine fluid (e.g., hot gas flow 112) flowing over turbine nozzle 100. More specifically, outlet 126 may discharge the cooling fluid to a flow path of hot gas flow 112, as hot gas flow 112 passes over turbine nozzle 100.

Figure 5:
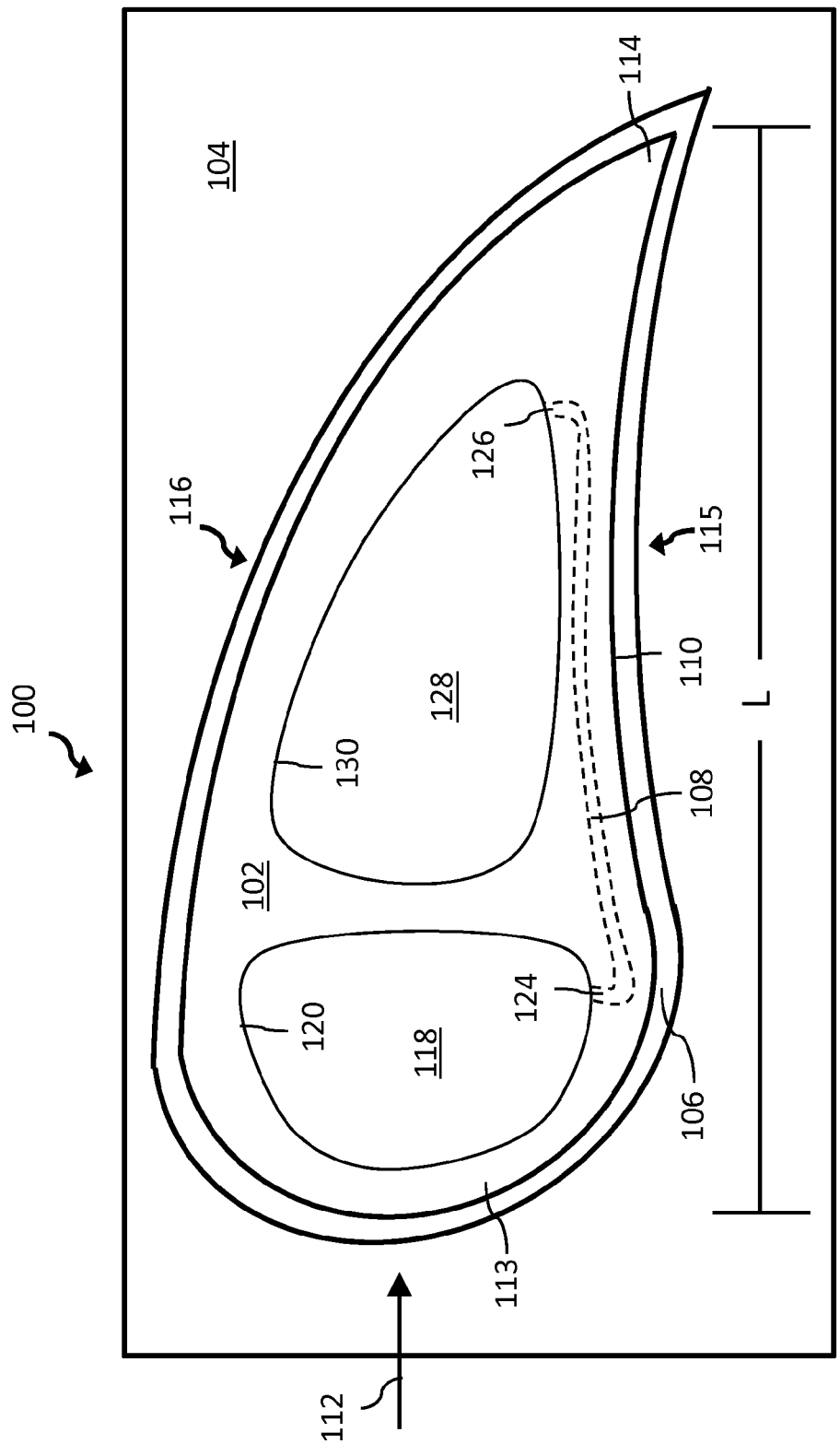
FIG. 5 shows a cross-sectional view of a turbine nozzle including a non-linear cooling conduit, according to a further alternative embodiment of the invention.
Figure 6:
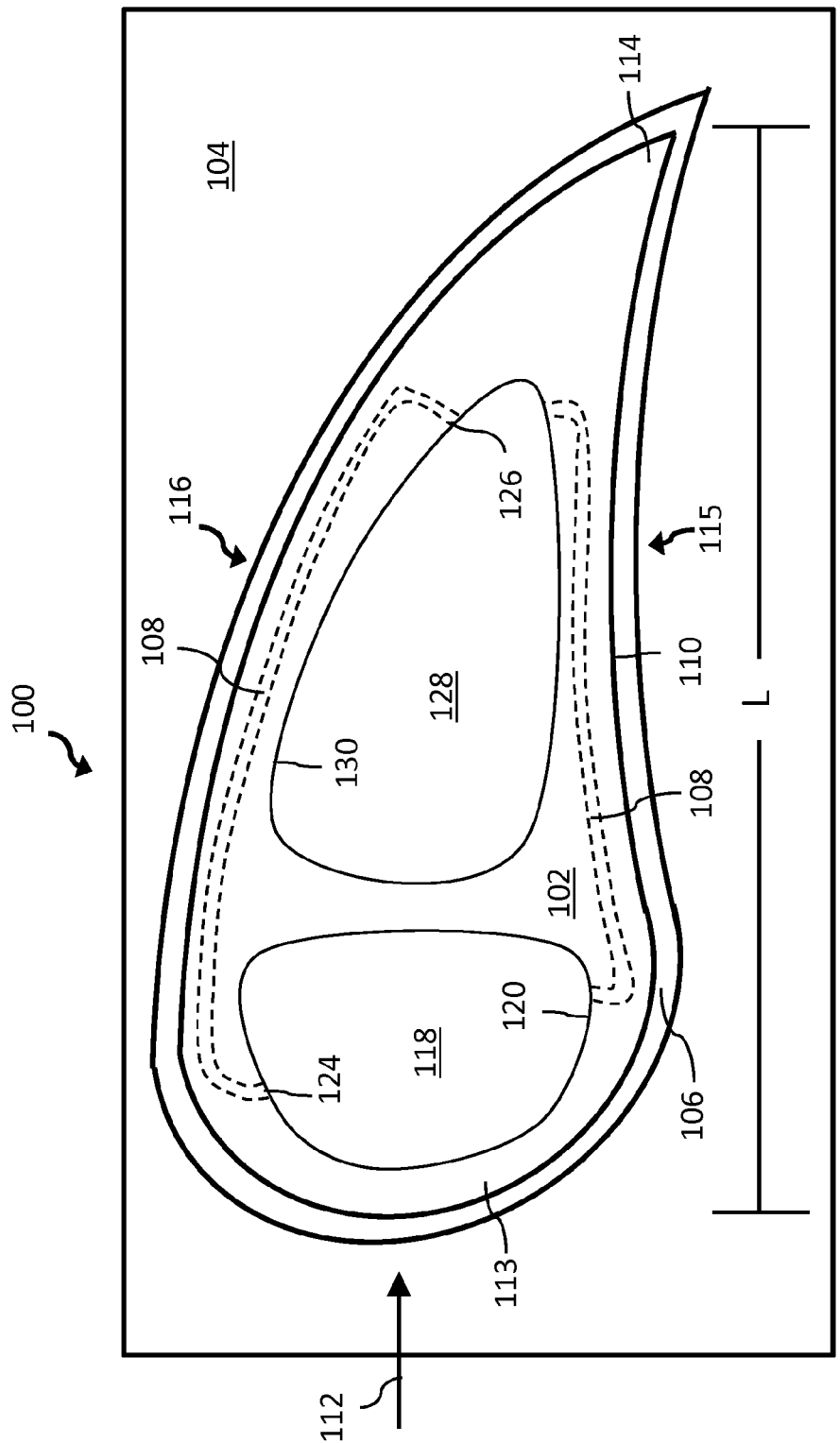
FIG. 6 shows a cross-sectional view of a turbine nozzle including a non-linear cooling conduit, according to an additional alternative embodiment of the invention.

In alternative embodiments, as shown in FIGS. 5 and 6, airfoil 102 of turbine nozzle 100 may also include a discharge cavity 128. Discharge cavity 128 may be located within airfoil 102 of turbine nozzle 100 and may be substantially adjacent cooling fluid cavity 118. Additionally, discharge cavity 128 may receive discharged cooling fluid from non-linear cooling conduit 108. In an embodiment, as shown in FIGS. 5 and 6, outlet 126 may be fluidly connected to discharge cavity 128. More specifically, outlet 126 may be located on an inner surface 130 of discharge cavity 128, and cooling fluid may be discharged from outlet 126 of non-linear cooling conduit 108 to discharge cavity 128 of turbine nozzle 100.

Referring back to FIG. 4, a cross-sectional view of a portion of turbine nozzle 100 including non-linear cooling conduit 108, according to embodiments of the invention is provided. In the Figures, it is understood that similarly numbered components may represent substantially similar components, which can function in a substantially similar manner. Redundant explanation of these components has been omitted for clarity. As shown in FIG. 4, turbine nozzle 100 may also include a at least one thermal barrier coating 132 over outer surface 110. Thermal barrier coating 132 may additionally cool turbine nozzle 100. More specifically, thermal barrier coating 132 may also act as an insulator of turbine nozzle 100 such that, thermal barrier coating 132 may prevent outer surface 110 of turbine nozzle from coming in direct contact with the hot gas flow. Additionally, thermal barrier coating 132 may substantially prevent the cooling fluid from rising in temperature within cooling fluid cavity 118 before cooling fluid is received by inlet 124 and moved through non-linear cooling conduit 108.

Figure 7:
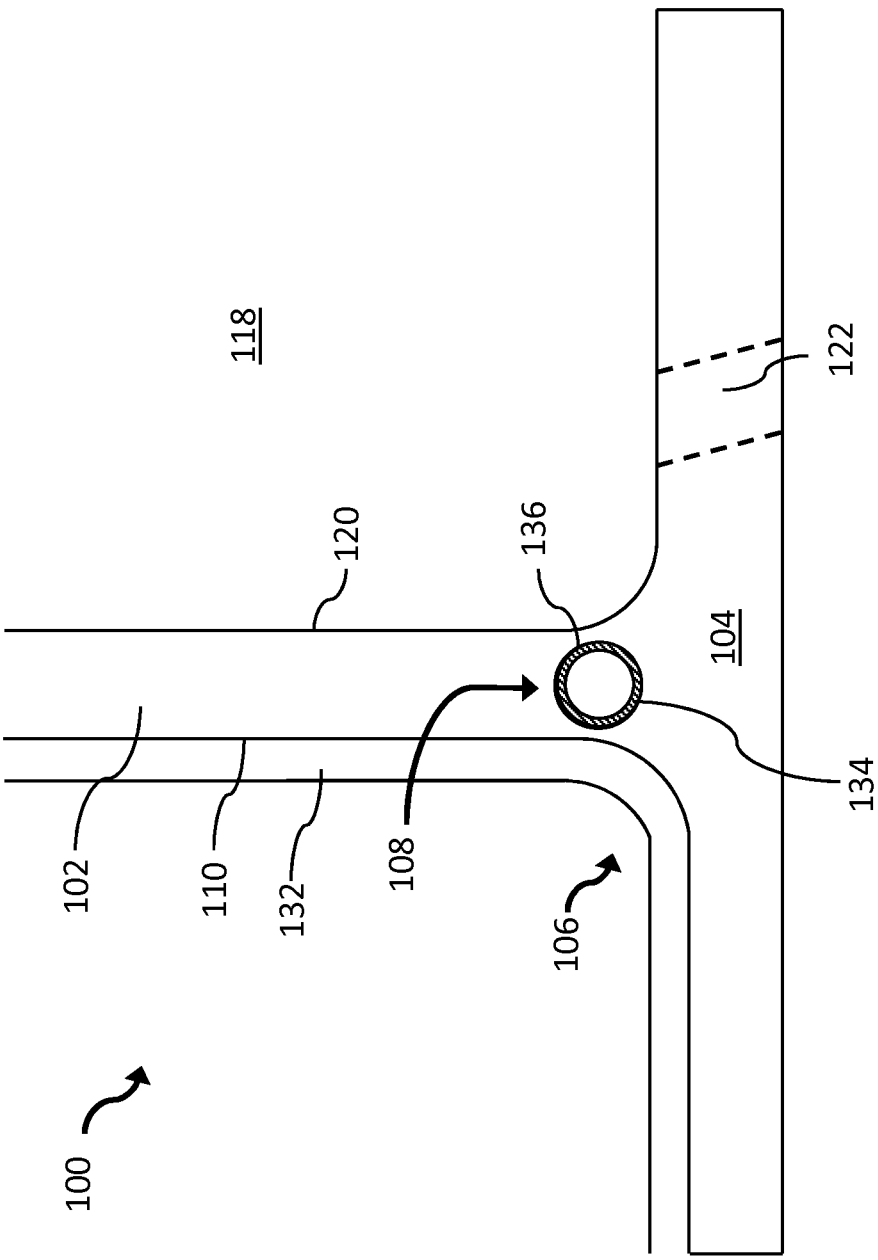
FIG. 7 shows a cross-sectional view of a portion of a turbine nozzle including a non-linear cooling conduit having turbulators, according to embodiments of the invention.

Turning to FIG. 7, a cross-sectional view of a portion of turbine nozzle 100 including non-linear cooling conduit 108 having at least one turbulator 134, according to embodiments of the invention is provided. In an embodiment, as shown in FIG. 7, non-linear cooling conduit 108 may further include an inner surface 136 and at least one turbulator 134 formed on inner surface 136 of non-linear cooling conduit 108. The turbulators 134, as shown in FIG. 7, may modify fluid flow through non-linear cooling conduit 108. More specifically, turbulators 134 may provide roughness to inner surface 136 of non-linear cooling conduit 108, which may, in part, enhance heat transfer within non-linear cooling conduit 108 by increasing surface area and turbulent mixing for more effective cooling. Ultimately, the inclusion of turbulators 134 may allow the cooling fluid to more effectively cool fillet region 106 as the cooling fluid passes through non-linear cooling conduit 108. Turbulators 134 may be formed on inner surface 136 by any conventional technique now known or later developed. For example, turbulators 134 may be formed on inner surface 136 by utilizing an electrode when forming non-linear cooling conduit 108. By engaging the electrode at varying electrical discharge rates for electro-discharge machining (EMD), or chemical reaction rates for electrochemical machining (ECM), variations (e.g., turbulators 134) may be formed on inner surface 136 of non-linear cooling conduit 108.

Figure 8:
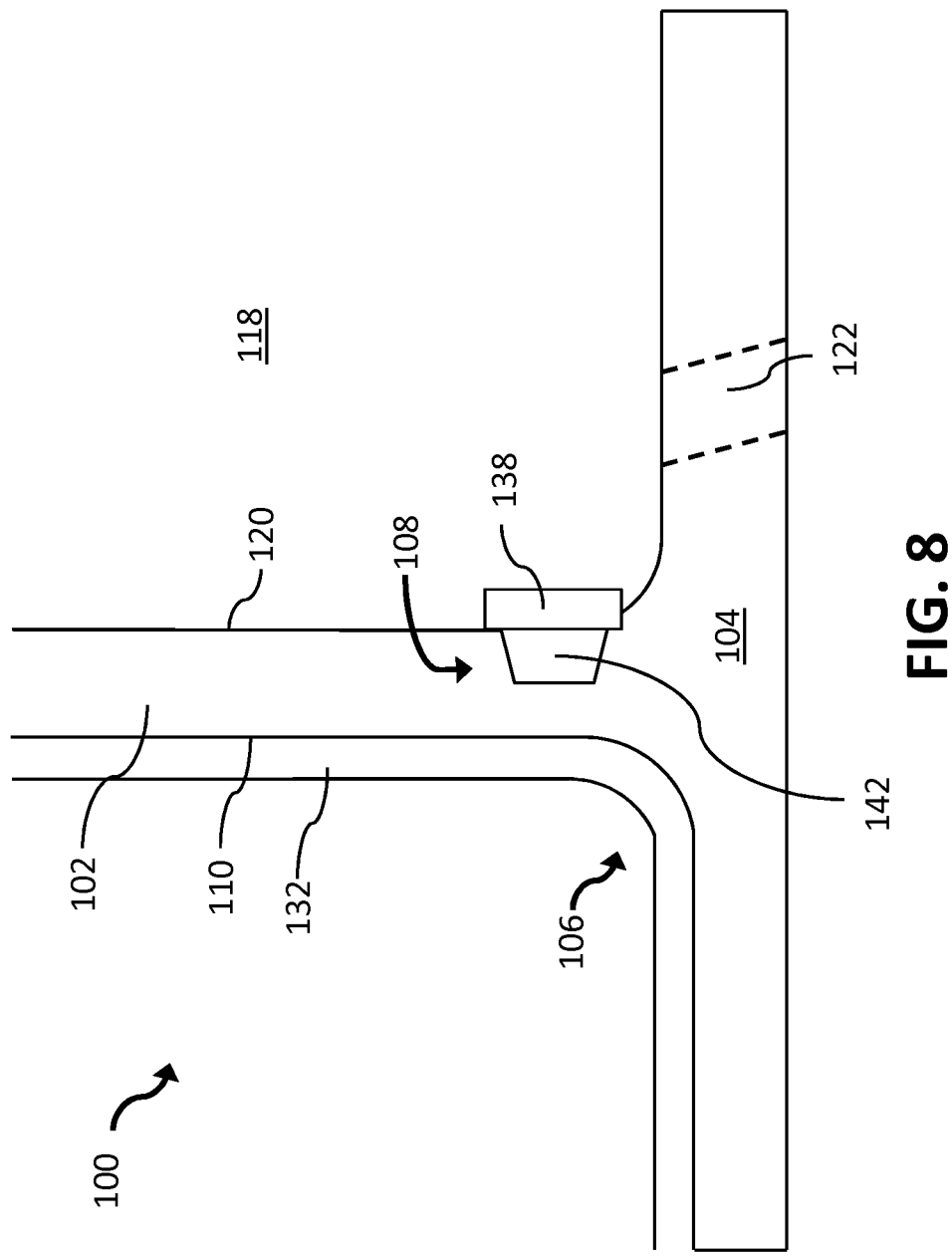
FIG. 8 shows a cross-sectional view of a portion of a turbine nozzle including a non-linear cooling conduit and an cover plate, according to embodiments of the invention.
Figure 9:
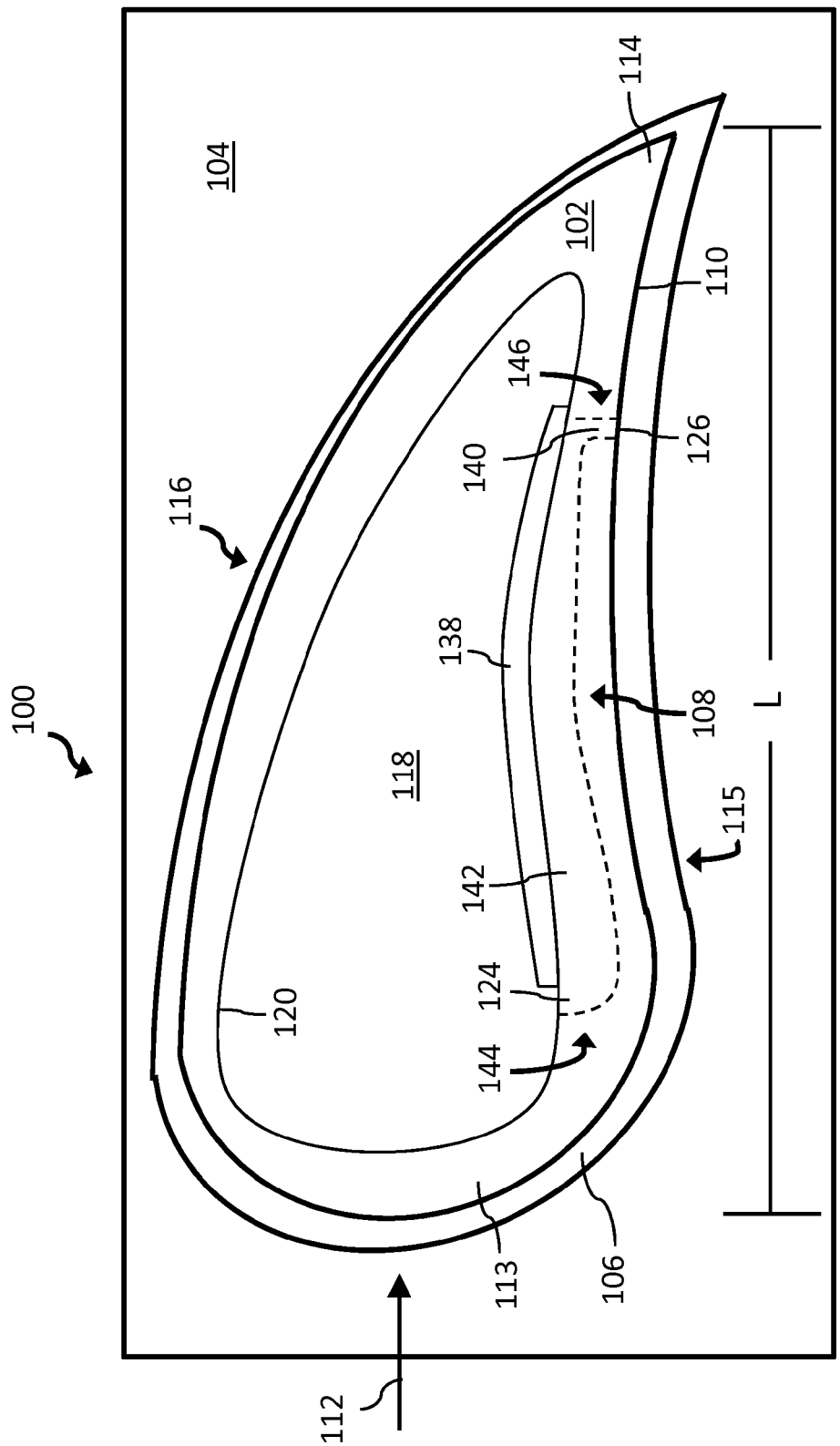
FIG. 9 shows a cross-sectional view of a turbine nozzle including a non-linear cooling conduit and an cover plate, according to embodiments of the invention.

Turning to FIG. 8, a cross-sectional view of turbine nozzle 100 including a non-linear cooling conduit 108 and a cover plate 138, according to embodiments of the invention is shown. In an embodiment, as shown in FIGS. 8 and 9, turbine nozzle 100 may include airfoil 102, cavity 118 located within airfoil 102, the cavity including inner surface 120, at least one endwall 104 adjacent airfoil 102 and fillet region 106 connecting airfoil 102 and endwall 104, where fillet region 106 includes outer surface 110. As shown in FIGS. 8 and 9, turbine nozzle 100 may also include an aperture 140 located on fillet region 106. Aperture 140 may extend through outer surface 110 of fillet region 106 to cooling fluid cavity 118 located within airfoil 102. More specifically, as shown in FIGS. 8 and 9, aperture 140 may be formed on outer surface 110 of fillet region 106 and may extend through airfoil 102 to inner surface 120 of cooling fluid cavity 118. Aperture 140 may be formed by any now know or later developed technique, as discussed in greater detail below.

In an embodiment, as shown in FIGS. 8 and 9, turbine nozzle 100 may also include a groove 142 formed on a portion of inner surface 120 of fillet cooling fluid cavity 118 substantially adjacent aperture 140. More specifically, as shown in FIG. 9, groove 142 may include a first end 144 formed on inner surface 120 of cooling fluid cavity 118, and a second end 146 formed a predetermined distance away from first end 144 of groove 142 in the axial length (L). Second end 146 of groove 142 may intersect aperture 140 of turbine nozzle 100, and more specifically, second end 146 may be end and be integral with aperture 140. As shown in FIG. 9, groove 142 may span substantially along the axial length (L) of airfoil 102 between leading edge 113 and trailing edge 114, as similarly described with respect to FIGS. 1 and 2. Groove 142 may be formed by any now know or later developed technique, as discussed in detail below.

Also shown in FIGS. 8 and 9, turbine nozzle 100 may include cover plate 138 positioned over aperture 140 and a portion of groove 142 formed on inner surface 120 of cooling fluid cavity 118. In an embodiment, as shown in FIGS. 8 and 9, cover plate 138 may form non-linear cooling conduit 108 between cooling fluid cavity 118 of airfoil 102 and outer surface 110 of fillet region 106. In an embodiment, as shown in FIG. 9, non-linear cooling conduit 108 may be formed such that cooling fluid of cooling fluid cavity 118 may be received by first end 144 of groove 142, which may not be covered by cover plate 138, and move between cover plate 138 and groove 142 along the axial length (L) of airfoil 102 of turbine nozzle 100 in order to cool fillet region 106. As previously discussed with respect to FIGS. 1 and 2, cooling fluid cavity 118 may include the cooling fluid for cooling fillet region 106 of turbine nozzle 100 via non-linear cooling conduit 108.

As shown in FIG. 8, cover plate 138 may be coupled to inner surface 120 of cooling fluid cavity 118 to form an airtight seal between cover plate 138 and groove 142 so cooling fluid may move through the formed non-linear cooling conduit 108. In an embodiment, as shown in FIG. 9, cover plate 138 may be formed to include a curve in the axial direction in order to ensure non-linear cooling conduit 108 is substantially curved (e.g., non-linear). As shown in FIG. 9, cover plate 138 includes an arc profile substantially similar to the arc profile of airfoil 102. More specifically, cover plate 138 may be coupled to a face (e.g., pressure face 115) of airfoil 102 and may include an arc profile substantially similar to the arc profile of the face (e.g., pressure face 115) of airfoil 102.

In an embodiment, as shown in FIG. 9, non-linear cooling conduit 108 may be located within fillet region 106 proximate pressure face 115 of airfoil 102. This is similar to an embodiment as shown in FIGS. 1 and 2. In an alternative embodiment, not shown, and similar to an embodiment as shown in FIG. 3, non-linear cooling conduit 108 may be located within fillet region 106 proximate suction face 116 of airfoil 102.

Also shown in FIG. 9, non-linear cooling conduit 108 may also include inlet 124 located on inner surface 120 of cavity 118, as similarly discussed above. The inlet 124 may be formed by groove 142. Additionally, non-linear cooling conduit 108, as shown in FIG. 9, may include outlet 126 located on outer surface 110 of fillet region 106. In an embodiment, as best seen in FIG. 9, outlet 126 may be formed by groove 142 formed by aperture 140. More specifically, outlet 126 may be formed by covering second end 146 of groove 142 and aperture 140 with cover plate 138. By covering aperture 140 and a portion of groove 142, excluding first end 144, cover plate 138 forms a conduit (e.g., non-linear cooling conduit 108) in fluid communication with cooling fluid cavity 118 and outer surface 110 of fillet region 106. As similarly described above, outlet 126 of non-linear cooling conduit 108 is fluidly connected to a flow path of a turbine fluid (e.g., hot gas flow 110) flowing over turbine nozzle 100, as best shown in FIG. 9.

Figure 10:
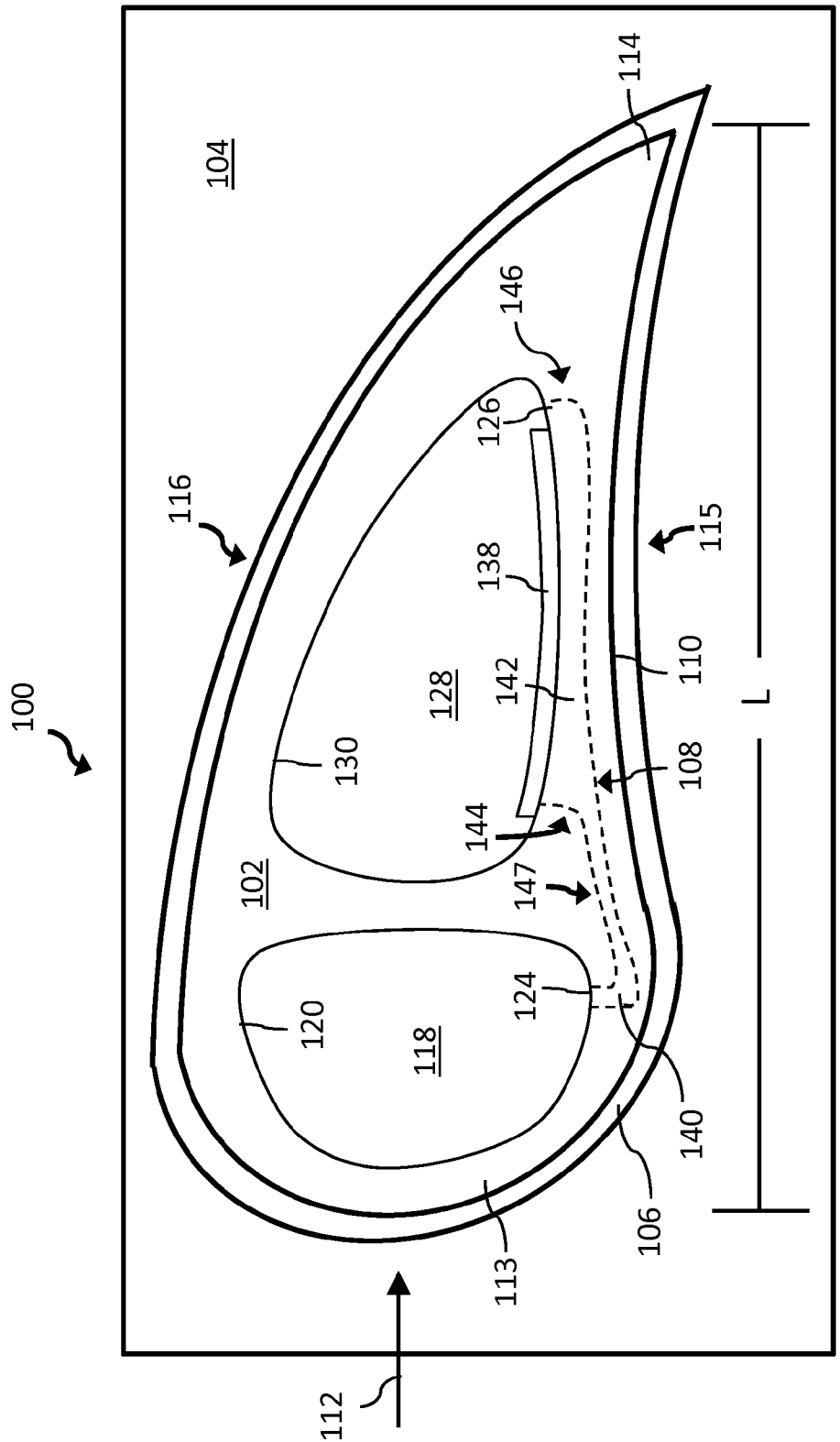
FIG. 10 shows a cross-sectional view of a turbine nozzle including a non-linear cooling conduit and an cover plate, according to an alternative embodiment of the invention.

In an alternative embodiment, as shown in FIG. 10, outlet 126 of non-linear cooling conduit 108 formed by cover plate 138 may be fluidly connected to discharge cavity 128. More specifically, and as previously described with respect to FIGS. 5 and 6, airfoil 102 may include cooling fluid cavity 118 and a discharge cavity 128, such that non-linear cooling conduit 108 may move cooling fluid from cooling fluid cavity 118 to discharge cavity 128 for cooling fillet region 106 of turbine nozzle 100. As shown in FIG. 10, aperture 140 may be formed through outer surface 110 of airfoil 102 to cooling fluid cavity 118. Aperture 140 may form inlet 124 of non-linear cooling conduit 108 on inner surface 120 of cooling fluid cavity 118. More specifically, as shown in FIG. 10, aperture 140 may be formed partially through airfoil 102, in order to aid in forming non-linear cooling conduit 108, as described below. As shown in FIG. 10, cooling fluid cavity 118 may be in fluid communication with discharge cavity 128 by non-linear cooling conduit 108. More specifically, a passage 147 may be formed in airfoil 102 to fluidly connect cooling fluid cavity 118 and discharge cavity 128.

In an embodiment, as shown in FIG. 10, groove 142 may be formed on inner surface 130 of discharge cavity 128 substantially adjacent passage 147. More specifically, groove 142 may include first end 144, substantially adjacent passage 147, and second end 146 formed a predetermined distance away from first end 144 of groove 142 in the axial length (L) of discharge cavity 128. As shown in FIG. 10, and in contrast to FIG. 9, cover plate 138 may be coupled to inner surface 130 of discharge cavity 128 and may cover first end 144, and not second end 146 of groove 142. As such, the uncovered portion of groove 142 at second end 146 may form outlet 126. As discussed above with reference to FIGS. 5 and 6, outlet 126 of non-linear cooling conduit 108 may continuously discharge cooling fluid into discharge cavity 128 during the operation of a turbine system utilizing turbine nozzle 100.

Figure 11:
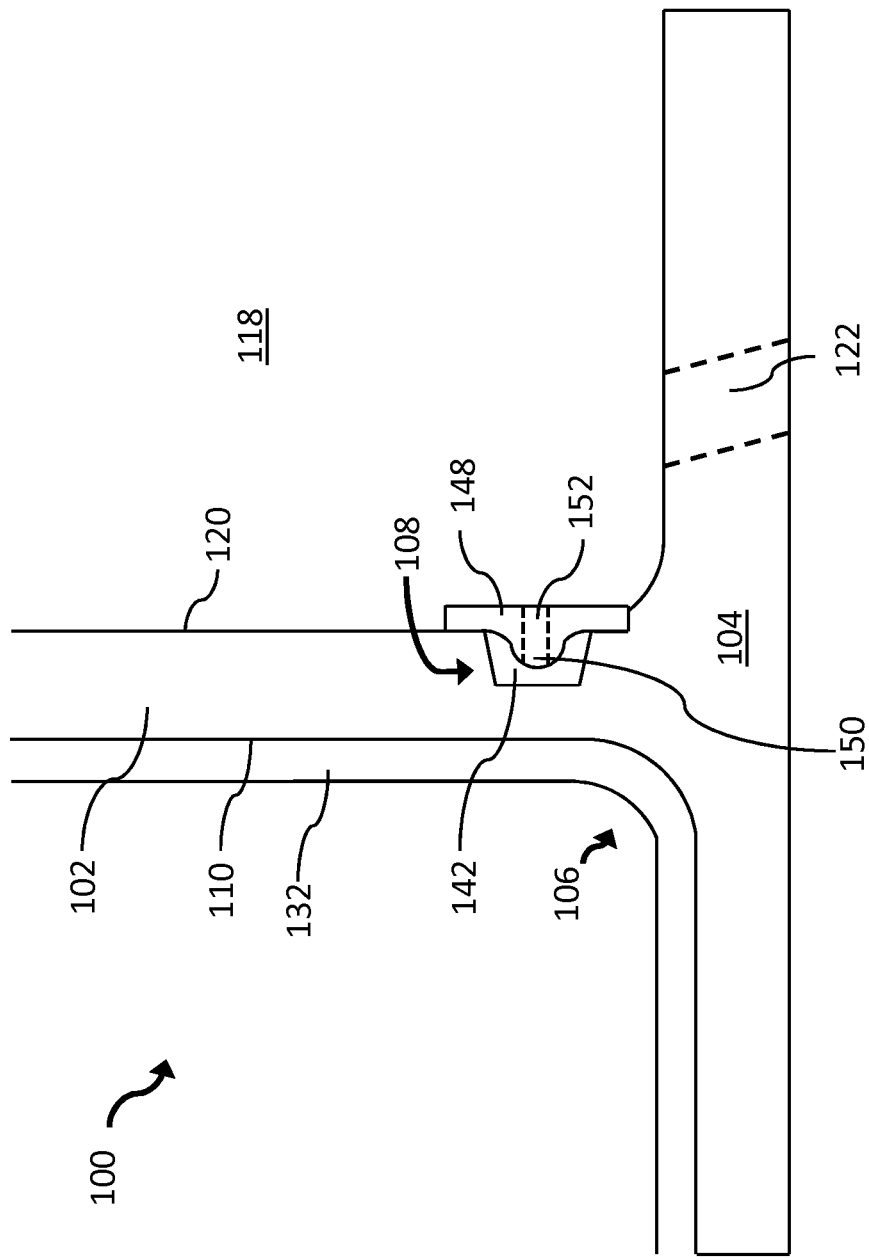
FIG. 11 shows a cross-sectional view of a portion of a turbine nozzle including a non-linear cooling conduit and an impingement plate, according to an additional alternative embodiment of the invention.

Turning to FIG. 11, a vertical cross-sectional view of a portion of turbine nozzle 100 including non-linear cooling conduit 108 and an impingement plate 148, according to an embodiment of the invention is provided. In an embodiment, as shown in FIG. 11, impingement plate 148 may include a protrusion 150 positioned in the center of impingement plate 148. Protrusion 150 may substantially extend into the center of non-linear cool conduit 108 formed by impingement plate 148, and groove 142. As shown in FIG. 11, impingement plate 148 may also include at least one cooling hole 152 positioned along the length of impingement plate 148. Cooling hole 152 may extend substantial through impingement plate 148, and may be in fluid communication with non-linear cooling conduit 108. Cooling hole 152 may provide additional cooling fluid to non-linear cooling conduit 108 along the axial length (L) of airfoil 102 as the cooling fluid moves through non-linear cooling conduit 108. That is, cooling hole 152 may provide an additional inlet for the cooling fluid to flow into non-linear cooling conduit 108 before reaching outlet 126, in order to provide additional cooling to fillet region 106 as hot gas flow 112 (FIG. 1) flows over turbine nozzle 100. The use of cooling hole 152 by turbine nozzle 100 may allow form specific spot cooling of fillet region 106. More specifically, cooling hole 152 may provide additional cooling fluid to a specific portion of non-linear cooling conduit 108 in a specific location of fillet region 106 that may require extra cooling due to hot gas flow 110 flowing over turbine nozzle 100.

Figure 12:
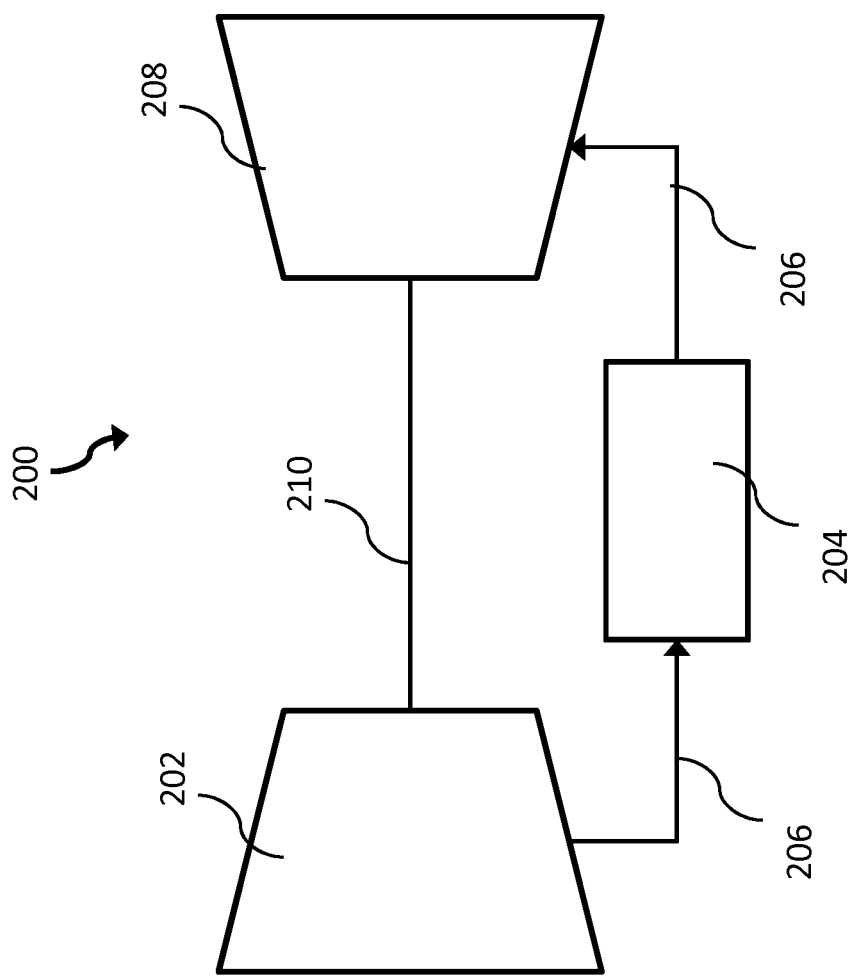
FIG. 12 shows a schematic depiction of a turbine system including a turbine nozzle, according to embodiments of the invention.
Figure 13:
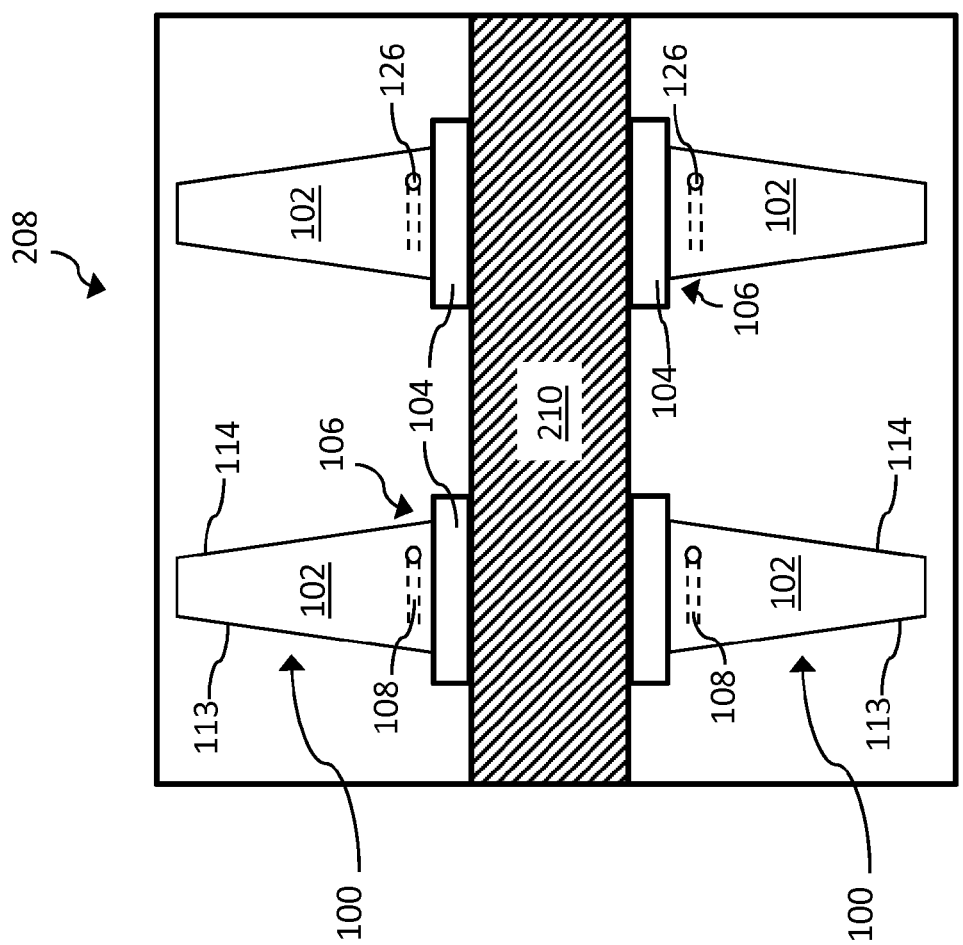
FIG. 13 shows a cross-sectional view of a portion of a turbine including a turbine nozzle, according to embodiments of the invention.

Turning to FIGS. 12 and 13, a schematic depiction of a turbine system and a cross-sectional view of a portion of a turbine of the turbine system are shown according to embodiments of the invention. In an embodiment, as shown in FIG. 12, turbine system 200 may include any conventional combustion turbine system for generating power. As such, basic functionality of the majority of turbine system 200 and the turbine system components as shown in FIG. 12 is provided below for clarity. Turbine system 200 may include a compressor 202, a combustor 204 in fluid communication with compressor 202 via conduit 206, and a turbine 208 in fluid communication with combustor 204. Turbine 208 may also be coupled to compressor 202 via shaft 210. As best shown in FIG. 13, turbine 208 of turbine system 200 may include at least one turbine nozzle 100. More specifically, in an embodiment, as shown in FIG. 13, turbine nozzle 100 may be a rotating airfoil coupled to shaft 210 of turbine system 200. As shown in FIG. 13, a plurality of turbine nozzles 100 may be coupled to shaft 210 to provide the various stages of buckets included in conventional gas turbines, e.g., turbine 208. In an embodiment, as shown in FIG. 13, endwall 104 may be a bucket base and airfoil 102 may be a bucket blade included in turbine system 200, such that turbine nozzle 100 may aid in moving hot gas flow 110 through turbine system 200. In an alternative embodiment where turbine nozzle 100 may be a stator vane (not shown), turbine nozzle 100 may be coupled to a housing (not shown) of turbine 208 for directing turbine fluid (e.g., hot gas flow 110) through turbine 208.

As shown in FIG. 13, and as described above, turbine nozzle 100 may include airfoil 102, at least one endwall 104 adjacent airfoil 102, fillet region 106 connecting airfoil 102 and endwall 104 including outer surface 110, as previously discussed with reference to FIGS. 1 and 2. As similarly described above, turbine nozzle 100 may also include non-linear cooling conduit 108 located within fillet region 106 and adjacent outer surface 110 of fillet region 106. Non-linear cooling conduit 108 may allow fluid flow through fillet region 106 during operation of turbine system 200. As similarly shown and described with reference to FIGS. 1 and 2, non-linear cooling conduit 108 spans substantially along an axial length (L) of airfoil 102 between leading edge 113 and trailing edge 114. Additionally, non-linear cooling conduit includes an arc profile substantially similar to an arc profile of airfoil 102.

By including an arc profile substantially similar to the arc profile of pressure face 115 (FIG. 2) or suction face 116 (FIG. 3) of airfoil 102, non-linear cooling conduit 108 may be positioned adjacent outer surface 110 of fillet region 106 for allowing fluid flow through cooling fillet region 106 during operation of turbine system 200. That is, a single non-linear cooling conduit 108 positioned substantially along the axial length (L) of airfoil 102 and adjacent outer surface 110 of fillet region 106 may provide fillet region 106 with improved cooling means during operation of turbine system 200. Additionally, as a result of including non-linear cooling conduit 108 within fillet region 106, the need for cooling fluid that may transported through non-linear cooling conduit 108 may be reduced during operation of turbine system 200. More specifically, because non-linear cooling conduit is positioned substantially along the axial length (L) of airfoil 102, the cooling fluid in non-linear cooling conduit 108 may utilize its maximum heat-capacity for cooling fillet region 106, before being discharged from non-linear cooling conduit 108.

Various additional embodiments of the invention can include a method of cooling a turbine nozzle, e.g., turbine nozzle 100. In some embodiments, the method of cooling may include providing turbine nozzle 100. As previously discussed above with reference to FIGS. 1 and 2, turbine nozzle 100 may including airfoil 102, cavity 118 located within airfoil 102, endwall 104 adjacent airfoil 102, fillet region 106 connecting airfoil 102 and endwall 104, and non-linear cooling conduit 108 located in fillet region 106 and adjacent outer surface 110 of fillet region 106. Non-linear cooling conduit 108 of turbine nozzle 100 may also include inlet 124 located on inner surface 120 of cavity 118 and outlet 126 located on outer surface 110 of fillet region 106. The method of cooling turbine nozzle 100 may also include providing cooling fluid to cavity 118 via endwall aperture 122. The method of cooling may further include continuously providing cooling fluid from cavity 118 to inlet 124 of non-linear cooling conduit 108 during operation of turbine system 200, and moving the cooling fluid through non-linear cooling conduit 108 substantially along the axial length (L) of airfoil 102. Finally, the method of cooling nozzle 100 may include discharging the cooling fluid from outlet 126 of non-linear cooling conduit 108 to one of a flow path of a turbine fluid (e.g., hot gas flow 112) flowing over turbine nozzle 100, or discharge cavity 128 located within airfoil 102 of turbine nozzle 100.

As described above, turbine nozzle 100 may be including in a gas turbine system, e.g., turbine system 200. It is understood, however, that turbine nozzle 100 may be utilized by a steam turbine system, where turbine nozzle 100 may include a stator vane (static nozzle) in a static nozzle assembly, or a non-stationary (e.g., rotating) airfoil within a set of rotor airfoils for any conventional steam turbine system.

Although only a single non-linear cooling conduit 108 is included in turbine nozzle 100, it is understood that that a plurality of non-linear cooling conduits 108 may be utilized by turbine nozzle 100 for cooling fillet region 106. More specifically, it is understood that a plurality of non-linear cooling conduits 108 may be positioned in series and/or in parallel of each other along a face (e.g., pressure face 115, suction face 116) of turbine nozzle 100. The plurality of non-linear cooling conduits 108 may provide cooling fluid along a fillet region 106 of turbine nozzle 100 to substantially cool the fillet region 106, as well as provide specific section or location cooling in areas of turbine nozzle 100 that may require additional cooling. That is, the plurality of non-linear cooling conduits may have a plurality of outlets 126 positioned in specific locations of fillet region 106 to provide additional cooling fluid in the specific locations of turbine nozzle 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine nozzle comprising:
    an airfoil;
    at least one endwall adjacent the airfoil;
    a fillet region connecting the airfoil and the at least one endwall, the fillet region including an outer surface;
    a first cavity located within the airfoil;
    a second cavity located within the airfoil; and
    a non-linear cooling conduit located within the fillet region and adjacent the outer surface of the fillet region, the non-linear cooling conduit being in fluid communication with the first and second cavities and allowing fluid flow from the first cavity to the second cavity through the fillet region.

2. The turbine nozzle of claim 1, wherein the airfoil includes:
    a leading edge; and a trailing edge opposite the leading edge, wherein the non-linear cooling conduit spans substantially along an axial length of the airfoil between the leading edge and the trailing edge.

3. The turbine nozzle of claim 1, wherein the airfoil includes a pressure face, and wherein the non-linear cooling conduit is located proximate the pressure face of the airfoil.

4. The turbine nozzle of claim 1, wherein the airfoil includes a suction face, and wherein the non-linear cooling conduit is located proximate the suction face of the airfoil.

5. The turbine nozzle of claim 1, wherein the non-linear cooling conduit includes an arc profile substantially similar to an arc profile of the airfoil.

6. The turbine nozzle of claim 1, wherein the non-linear cooling conduit further includes:
- an inner surface; and
- at least one turbulator formed on the inner surface of the non-linear cooling conduit for modifying fluid flow through the non-linear cooling conduit.

7. The turbine nozzle of claim 1, further including a plurality of non-linear cooling conduits located within the fillet region and adjacent the outer surface of the fillet region.

8. A turbine nozzle comprising:
- an airfoil;
- at least one cavity located within the airfoil, the cavity including an inner surface;
- at least one endwall adjacent the airfoil;
- a fillet region connecting the airfoil and the at least one endwall, the fillet region including an outer surface;
- an aperture extending through the outer surface of the fillet region to the cavity within the airfoil;
- a groove formed on a portion of the inner surface of the at least one cavity substantially adjacent the aperture; and
- a cover plate positioned over the aperture and a portion of the groove formed on the inner surface of the at least one cavity, the cover plate forming a non-linear cooling conduit between the cavity and the outer surface of the fillet region.

9. The turbine nozzle of claim 8, wherein the airfoil includes:
- a leading edge; and
- a trailing edge,
- wherein the groove spans substantially along an axial length of the airfoil between the leading edge and the trailing edge.

10. The turbine nozzle of claim 8, wherein the airfoil includes a pressure face, and wherein the non-linear cooling conduit is located proximate the pressure face of the airfoil.

11. The turbine nozzle of claim 8, wherein the airfoil includes a suction face, and wherein the non-linear cooling conduit is located proximate the suction face of the airfoil.

12. The turbine nozzle of claim 8, wherein the cavity includes a cooling fluid for cooling the fillet region of the turbine nozzle via the non-linear cooling conduit.

13. The turbine nozzle of claim 8, wherein the non-linear cooling conduit includes:
- an inlet located on the inner surface of the cavity; and
- an outlet located on the outer surface of the fillet region.

14. The turbine nozzle of claim 13, wherein the outlet of the non-linear cooling conduit is fluidly connected to one of:
- a flow path of a turbine fluid flowing over the turbine nozzle, or
- a discharge cavity located within the airfoil of the turbine nozzle.

15. A turbine nozzle comprising:
- an airfoil;
- at least one endwall adjacent the airfoil;
- a fillet region connecting the airfoil and the at least one endwall, the fillet region including an outer surface; and
- a non-linear cooling conduit located within the fillet region and adjacent the outer surface of the fillet region, the non-linear cooling conduit for allowing fluid flow through the fillet region during operation of a turbine system including the turbine nozzle therein;
- an impingement plate separating at least a portion of the non-linear cooling conduit from a cavity within the airfoil, wherein the portion of the non-linear cooling conduit is located proximal to one of a pressure face and a suction face of the airfoil; and
- a cooling hole in fluid communication with the cavity within the airfoil and the non-linear cooling circuit, wherein the cooling hole extends through the impingement plate.

16. The turbine nozzle of claim 15, further comprising:
- a leading edge; and
- a trailing edge opposite the leading edge, wherein the non-linear cooling conduit spans substantially along an axial length of the airfoil between the leading edge and the trailing edge.

17. The turbine nozzle of claim 15, wherein the non-linear cooling conduit includes an arc profile substantially similar to an arc profile of the airfoil.

* * * * *